(12) United States Patent
Biver et al.

(10) Patent No.: US 6,991,827 B2
(45) Date of Patent: Jan. 31, 2006

(54) APPARATUS AND METHOD FOR DIP COATING LENSES

(75) Inventors: Claudine Biver, Nanterre (FR); Gerald Fournand, Tampa, FL (US)

(73) Assignee: Essilor International Compagnie Generale d'Optique, Charenton (FR)

( * ) Notice: Subject to any disclaimer, the term of this patent is extended or adjusted under 35 U.S.C. 154(b) by 0 days.

(21) Appl. No.: 10/702,510

(22) Filed: Nov. 7, 2003

(65) Prior Publication Data

US 2005/0098098 A1    May 12, 2005

(51) Int. Cl.
*B05D 5/06* (2006.01)
(52) U.S. Cl. .................. 427/169; 118/423; 118/57; 118/500; 427/162; 427/164
(58) Field of Classification Search ............... 118/500, 118/423, 56, 57; 134/135, 137, 901, 117; 427/162, 164, 169
See application file for complete search history.

(56) References Cited

U.S. PATENT DOCUMENTS

| 2,664,854 A | * | 1/1954 | Talbot |
| 3,167,079 A | * | 1/1965 | Weil |
| 4,388,164 A | | 6/1983 | Moll |
| 5,082,558 A | | 1/1992 | Burris |
| 6,355,104 B1 | * | 3/2002 | Polster |

* cited by examiner

*Primary Examiner*—Brenda A. Lamb
(74) *Attorney, Agent, or Firm*—Young & Thompson

(57) ABSTRACT

An apparatus for dip coating lenses comprises a tank for containing a coating liquid, a coating chamber for receiving one or more ophthalmic lenses. The tank is in fluid communication with the coating chamber for permitting the flow of coating liquid between the tank and the coating chamber. The apparatus has a first position where the coating chamber is located above the tank and second position where the tank is located above the coating chamber.

24 Claims, 3 Drawing Sheets

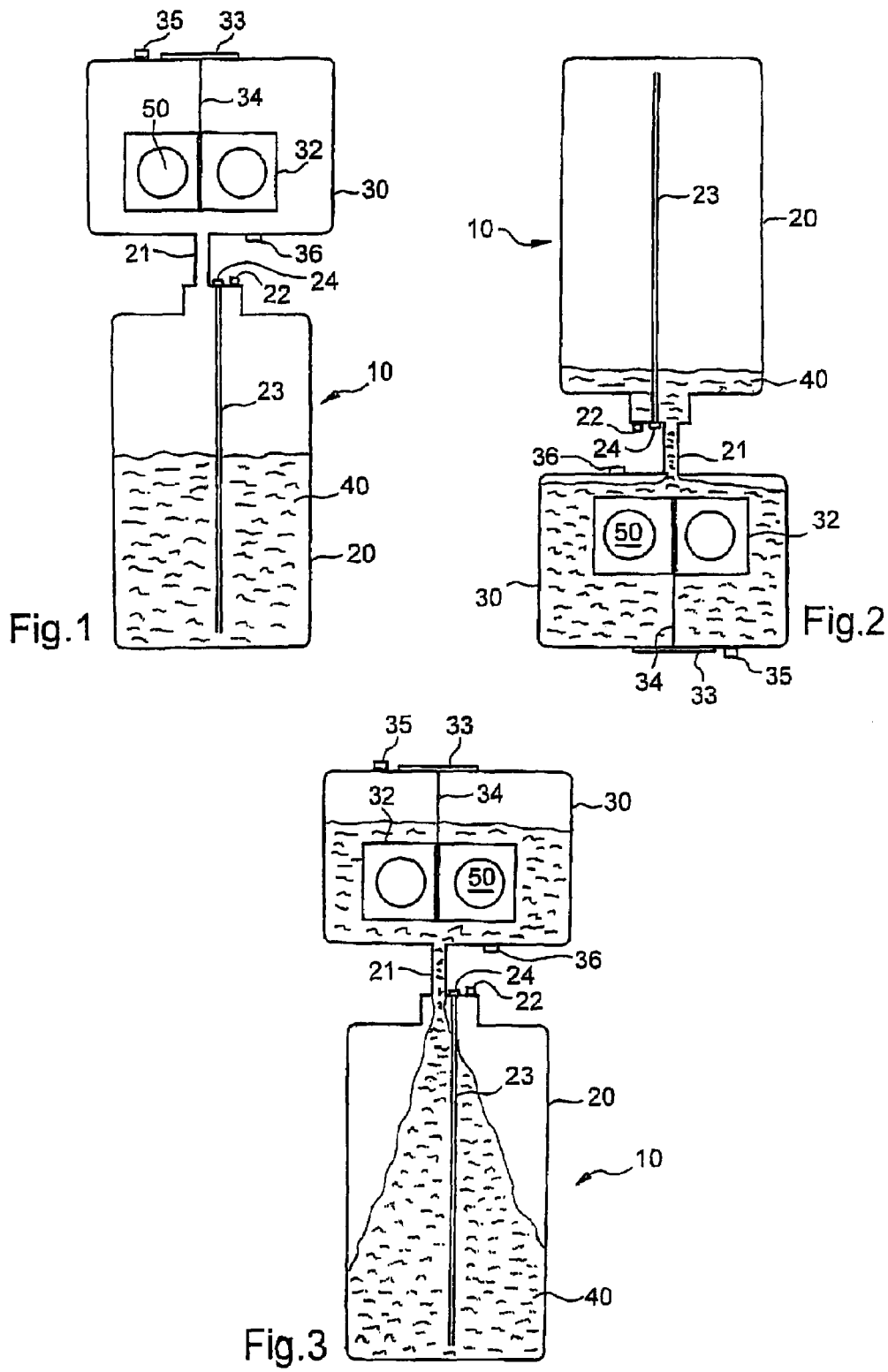

APPARATUS AND METHOD FOR DIP COATING LENSES

FIELD OF THE INVENTION

The invention concerns a method and apparatus for coating lenses such as ophthalmic lenses, and more particularly by dip coating.

BACKGROUND OF THE INVENTION

Dip coating has been used for coating ophthalmic lenses and optical lenses and is suitable for some coatings applied to such lenses, such as a top coat used as an anti-smudge coating to protect the underlying coating or bulk lens material from the accumulation of such dirt or grime on the lens surface and facilitate the cleaning of the lens. Such top coats have low surface energies such as 30 dynes and the highest performance top coats have very low surface energies of the order of 25 dynes.

Lenses having very low surface energies pose problems for their grinding to fit the contour of an eyeglass lens surround. For grinding, the lens must be mounted on a holding device and maintained into fixed position relative to the optical axis throughout the edge grinding operation and within narrow tolerances. When the lens has a very low surface energy, a temporary coating must be applied to the top coat, so that the contact between the lens and the holding device ensures that the required tolerances are maintained. Following the edge grinding operation, the temporary coating needs to be removed to reveal once again the underlying high performance top coat.

Conventional lower surface energy top coats are also widely used, but do not give the level of performance of very low surface energy top coats. Such conventional low surface energy top coats do not provide a high performance anti-smudge coating, but advantageously can be ground to contour without the need for a temporary coat, so that the lens can be securely held in axial alignment on the holding device.

It is also known to use dip coating for tinting ophthalmic lens.

Known dip coating apparatus for ophthalmic lenses are suitable in industrial scale coating operations. Such apparatus typically have a large high footprint, involve both relatively complicated mechanical equipment for moving lens continuously or in batches from station to station and control apparatus for controlling movement and the operating parameters of the process.

Generally speaking, there are two kinds of dip coating apparatuses. In first kind of dip coating apparatus the article, e.g., a lens, is lowered into a vat containing a coating liquid and after a predetermined coating time is removed from the vat and is allowed to dry or cure. In the second kind of dip coating apparatus, the level of the coating liquid in the vat is raised for coating and then lowered until the lens is no longer in contact with the liquid and the coated lens is dried or cured.

The manufacture of ophthalmic lenses involves many operations which may be carried out in the main production facility and other operations which are more economically or expediently carried out on the optician's premises and in particular the grinding of the lenses to fit a particular frame selected by the customer. Customers increasingly want to be able to select frames and have them fitted with prescription lenses in an hour. While it is possible for the optician to have in stock most common prescription lens blanks which can be ground to order in this reduced timeframe, the optician cannot offer the customer a choice of coatings for each such prescription lens including less expensive medium performance top coats and more expensive high performance top coats, let alone a variety of lens tints. Such customer on-site demands cannot be easily satisfied within the existing constraints of inventories, costs and timeframes.

SUMMARY OF THE INVENTION

An object of the invention is to enable the optician or other artisan to be able to offer one or more alternative treatments for standard lens blanks such as a high performance top coat or anti-abrasion coatings or primer coatings, or anti-fog coatings, or one or more tints which could not heretofore been economically offered on the optician's premises.

A further object is a simplified method and apparatus for dip coating lenses for use on an optician's premises.

According to the invention, there is provided an apparatus for dip coating lenses comprising a tank for containing a coating liquid, a coating chamber for receiving one or more ophthalmic lenses. The tank is in fluid communication with the coating chamber for permitting the flow of coating liquid between the tank and the coating chamber. The apparatus has a first position where the coating chamber is located above the tank and second position where the tank is located above the coating chamber.

According to a first embodiment the first position will normally be a lens loading/unloading position. The first position may also or alternatively be a position for draining the coating liquid from the coating chamber. Likewise, according to the first embodiment the second position of the apparatus will normally be a lens coating position. The second position may also or alternatively be a position for supplying the coating liquid to the coating chamber.

According to an embodiment the coating chamber is located immediately above the tank in the first position and the tank is located immediately above the chamber in the second position. In such a case, the tank may be supported by the coating chamber by tubular member for providing fluid communication between the coating chamber and the tank and/or by an alternative supporting member. The tubular member and/or alternative supporting member will in practice also support the tank on the coating chamber on the tank when the apparatus is in the second position. The connection between the tank and the coating chamber may be rigid, adjustable and/or releasable.

The apparatus advantageously comprises a self-contained unit. Such a unit may, according to an aspect of the invention, be conveniently pivotally mounted on a stand for movement between the first and second position. According to a simplified embodiment no such stand is employed and the unit may simply be positioned selectively so the coating chamber is on top in the first position and with the tank on top in the second position. Depending on the position the other of the coating chamber or tank supports the entire unit.

According to another aspect of the invention, there is provided a method for dip coating lenses comprising loading at least one lens in a coating chamber, simultaneously positioning the supply tank above the coating chamber and the coating chamber below the supply tank prior to transferring coating liquid from a tank to the coating chamber for coating the lenses therein, simultaneously positioning the coating chamber above supply tank and the supply tank below the coating chamber to drain the coating liquid from the coating chamber back to the tank, and then removing of coated lenses from the coating chamber.

According to an embodiment, the simultaneous positioning is effected by rocking, swinging or pivoting the supply tank and coating chamber conjointly.

These and other features and advantages of the invention will emerge further from the following description which refers to the accompanying drawings.

BRIEF DESCRIPTION OF THE DRAWINGS

FIG. 1 is a schematic longitudinal sectional view of a first embodiment of the apparatus according to the present invention, with the coating chamber located above the tank before the lenses are loaded and coated;

FIG. 2 is a schematic longitudinal view corresponding to FIG. 1, with the tank located above the coating chamber and showing the dispensing of coating liquid from the tank to the coating chamber loaded with lenses;

FIG. 3 is a schematic longitudinal sectional view of a first embodiment of the apparatus according to the present invention, with the coating chamber located above the tank for returning the coating liquid to the tank after the lenses are coated;

DETAILED DESCRIPTION OF PREFERRED EMBODIMENTS

Figure 4:
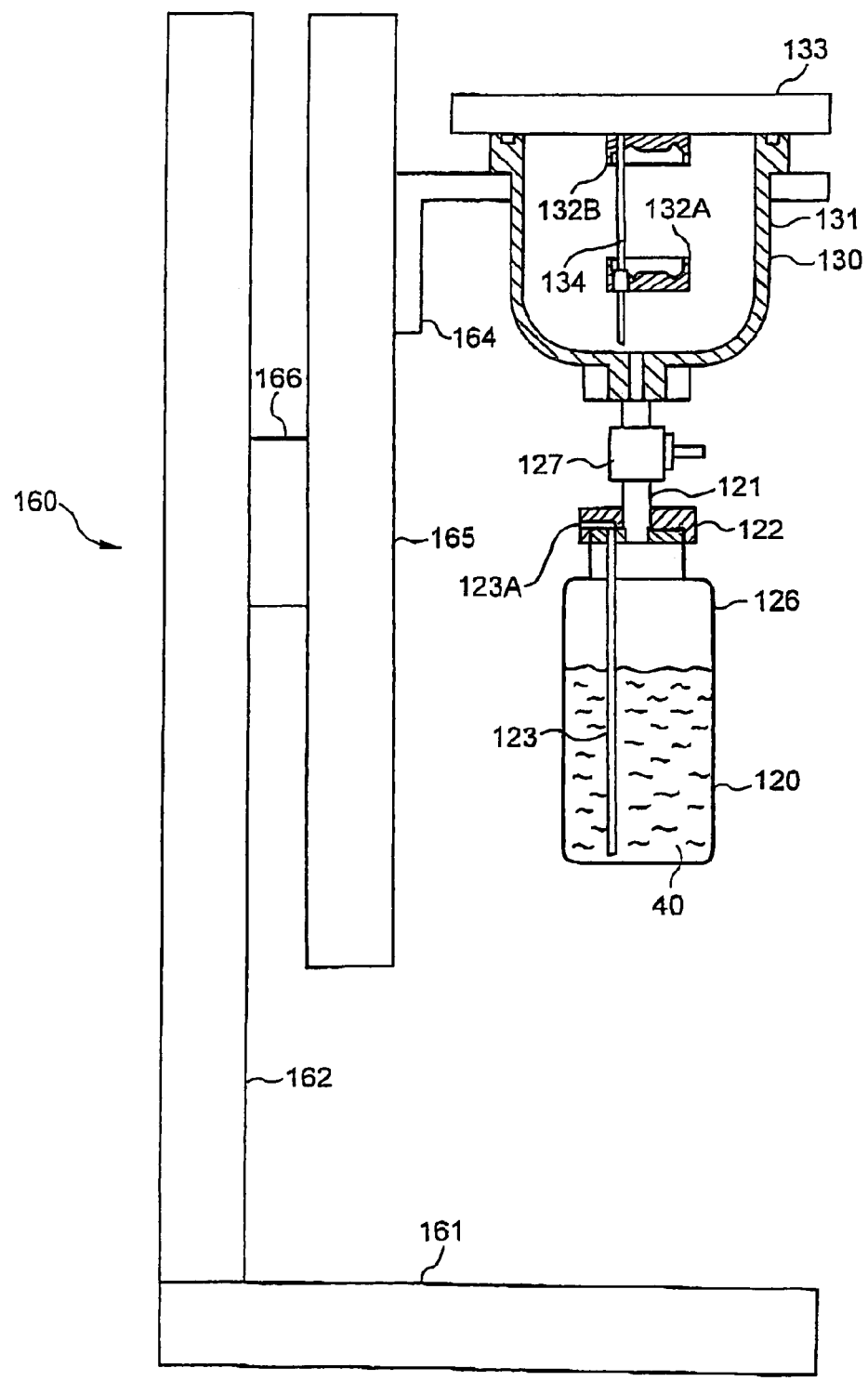
FIG. 4 is a schematic longitudinal sectional view of a second embodiment of the apparatus according to the present invention, with the coating chamber located above the tank before the lenses are loaded and coated.

The first embodiment of FIGS. 1–3 will now be described. The apparatus 10 for dip coating lenses, and more particularly ophthalmic lenses or lens blanks, or the like comprises a tank 20 for containing a coating liquid 40 and a coating chamber 30 having a support 32 for ophthalmic lenses 50 or the like.

The ophthalmic lenses or lens blanks, hereinafter referred to as ophthalmic lenses, may be made of conventional hard resin material or glass. Lens blanks typically have a diameter of 65 mm and a convex front face and a concave rear face, whereas ophthalmic lenses are edged to the desired frame surround contour. The ophthalmic lenses may be prescription or non-prescription. In the case of prescription lenses, they may be monofocal, bifocal, trifocal or progressive lenses.

The coating liquid may be for applying an anti-abrasive coating, a primer coating, an anti-fog coating, an anti-smudge top coat or a coating for tinting the lenses.

Suitable anti-abrasive or scratch resistant coatings are those made by curing a precursor composition including epoxyalkoxysilanes or a hydrolyzate thereof and a curing catalyst. Preferably the scratch resistant coatings contain at least one inorganic filler such as $SiO_2$ and/or metal oxides colloids. Examples of such compositions are disclosed in U.S. Pat. Nos. 4,211,823, 5,015,523 and PCT application WO 94/10230.

A suitable initial outermost coating layer is a hydrophobic and/or oleophobic top coat, and preferably such a top coat made from a composition comprising at least one fluorinated compound.

Preferred fluoro compounds are silanes and silazanes bearing at least one group selected from fluorocarbons, polyfluorocarbons, fluoropolyethers and polyfluoropolyethers, in particular perfluoropolyethers.

Fluorocompounds are disclosed, among others, in U.S. Pat. No. 4,410,563, European patents Nos. 0 203 730, 0749 021, 0844 265 and 0933 377.

Suitable fluorosilanes include compounds having the formulas:

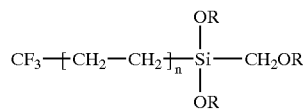

n=5, 7, 9 or 11 and R is an alkyl radical, typically a $C_1$–$C_0$ alkyl radical such as —$CH_3$, —$C_2H_5$ and —$C_3H_7$;

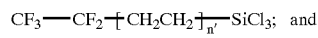

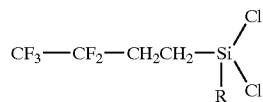

n'=7 or 9 and R is as defined above.

Compositions containing fluoro compounds also useful for making the top coat are disclosed in U.S. Pat. No. 6,183,872.

The silicon-containing organic fluoropolymer is represented by the general formula and has a number average molecular weight of from $5 \times 10^2$ to $1 \times 10^5$.

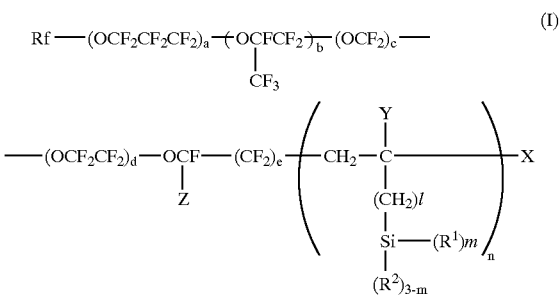

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and n represents an integer of 1 or above, preferably 2 or above.

Another class of preferred compositions for forming the initial top coat are those containing fluoropolyether groups, in particular polyfluoropolyether groups and in particular perfluoropolyether groups. A particular preferred class of compositions containing fluoropolyether groups is disclosed in U.S. Pat. No. 6,277,485.

The anti-smudge top coats of U.S. Pat. No. 6,277,485 are at least partially cured coatings comprising a fluorinated siloxane prepared by applying a coating composition (typically in the form of a solution) comprising at least one fluorinated silane of the following formula

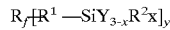

$$R_f[R^1-SiY_{3-x}R^2x]_y$$

wherein: $R_f$ is a monovalent or divalent polyfluoropolyether group, $R^1$ is a divalent alkylene group, arylene group, or combinations thereof, optionally containing one or more heteroatoms or functional groups and optionally substituted with halides, and preferably containing 2 to 16 carbon atoms; $R^2$ is a lower alkyl group (i.e., a $(C_1-C_4)$ alkyl group); Y is a halide, a lower alkoxy group (i.e., a $(C_1-C_4)$ alkoxy group, preferably, a methoxy or ethoxy group), or a lower acyloxy group (i.e., $-OC(O)R_3$ wherein $R_3$ is a $(C_1-C_4)$ alkyl group); x is 0 or 1; and y is 1 ($R_f$ is monovalent) or 2 ($R_f$ is divalent). Suitable compounds typically have a molecular weight (number average) of at least about 1000. Preferably, Y is a lower alkoxy group and $R_f$ is a perfluoropolyether group.

A commercial composition for the top coat is the composition KP 801M available from Shinetsu.

It will be appreciated that the present apparatus and method may be employed for other kinds of coatings.

The coating chamber 30 is in fluid communication with the tank 20, so that coating liquid 40 may be transferred from the tank to the coating chamber for coating and back to the tank after coating. As illustrated in FIGS. 1–3 embodiment, the coating chamber 30 is longitudinally fixed in position relative to the tank 20. As shown, a tubular member 21 defines the fluid communication between the coating chamber and the tank. In the embodiment of FIGS. 1–3, the tubular member 21 also defines a mechanical connection for fixing the coating chamber 30 relative to the tank 20. In the illustrated embodiment, the tubular member 21 is shown as being integral with the coating chamber and the tank but alternatively may be a separate element fixed to the coating chamber 30 and/or to the tank. The rigid connection may alternatively be releasable and/or adjustable, for example by means of threaded fasteners or snap-fasteners. In practice, the distance between the coating chamber and the tank will remain the same in the course of use. This distance can be adjusted before use according to the coating thickness difference accepted between the top and the bottom of the lens. It is also possible, for example, for the tubular member to be disconnected from the coating chamber and/or the tank for shipping and/or storage and reconnect them at the time of use. The tubular member may be permanently fixed to one of the coating chamber/tank and releasably connected to the other, in which case, suitable gasket or other sealing member (s) should be provided at the coupling.

Alternatively, and not shown, the mechanical connection between the tank 20 and the coating chamber 30 may be separate and distinct from the tubular member or the like defining fluid communication herebetween. For example, the fluid connection between the coating chamber 30 and tank 20 may be defined by a flexible hose which may be incapable of supporting the weight of the coating chamber/tank which would preferably be associated with a mechanical support or brace. Alternatively, the tank/coating chamber may be supported directly on one another and fluidly interconnected by a flexible hose or a relatively rigid tubular member. While it is convenient to have the fluid connection between the opposed walls of the tank/coating chamber, it will be appreciated that alternatively one opposed wall can be connected to the side wall of the other or the side walls may be connected together.

Typically, the volume of coating liquid in the tank will be 0.5 liter. The tank may be disposable or refillable. The tank is preferably equipped with a check valve 22 above the highest level of coating liquid in the tank and in practice near the upper end of the tank for selectively connecting and disconnecting the interior of the tank with the atmosphere. Also, the tank 20 is equipped with a venting tube 23 extending from the upper end of the tank to a location proximate the bottom wall of the tank. Another check valve 24 is located at the upper end of the tank and will be associated with the venting tube 23 for selectively connecting and disconnecting a venting tube with the surrounding atmosphere.

The coating chamber 30 may be somewhat of the same size or larger in volume than the tank 20. The coating chamber may be parallellepipedic, prismatic or cylindrical in configuration. The wall remote from the tank 20 or an upper portion of the side wall(s) thereof is equipped with an access door or cover. A suitable seal or gasket will be provided between the door or cover and an adjoining portion of this wall remote from the tank or the upper portion of side wall(s) to prevent linkage in the coating position of the apparatus. As illustrated, coating chamber 30 has an access cover 33 which may be threadedly coupled to a complementary threaded portion in the top wall, that is the wall of the coating chamber remote from the tank. In this illustrated embodiment, a lens support member 32 has a rod 34, suspending it to the cover 33. The cover 33 and lens support member 32 may be conjointly and entirely removable from the coating chamber, or alternatively the cover may be simply used to raise the lens support member 32 for loading and unloading one or more lenses 50 therein. Preferably, the lens support member 32 will orient the lenses so they are substantially vertical in the coating position and/or coating chamber draining position, such as illustrated in FIG. 3.

To facilitate the flow of coating liquid from the tank into the coating chamber, the wall of the coating chamber facing the top wall of the tank is equipped with a check valve 36 for selectively connecting and disconnecting the interior of the coating chamber with the surrounding atmosphere. Similarly, the wall of the coating chamber remote from the tank will also be equipped with a check valve 35 for selectively connecting or disconnecting the interior of the coating chamber from the surrounding atmosphere.

The coating chamber and tank may be delivered assembled or alternatively they may be delivered separately and assembled on site. To this end, the tank portion of the assembly, may be equipped with a closure member or valve for preventing communication between the interior of the tank and the surrounding atmosphere via the tubular member.

The method of dip coating lenses or the like will now be described together with the operating mode of the lens dip coating apparatus described above. The access door or cover 33 is opened or removed and lenses 50 are loaded in a substantially vertical position in the support member 32. The support member will typically accommodate one pair of lenses but might be equipped to accommodate some greater number of lenses, simply by increasing the number of slots for lenses. These lenses will be supported by their edges and their faces will be substantially out of contact with the lens support member. After loading, the access door or cover is closed and a seal is formed between the door or cover and the surrounding wall of the coating chamber.

The respective positions of the coating chamber/tank are changed and the check valves 24 and 36 are opened and valves 22 and 35 are closed. The tank is thus located above the coating chamber in the position illustrated in FIG. 2, whereby the coating liquid 40 is fed by gravity from the tank 20 to the coating chamber 30. The flow rate of coating liquid from the tank to the coating chamber may be adjusted, in which case a suitable flow regulating member will be provided in the tubular member fluidly connecting the tank and the coating chamber. The coating chamber may be allowed to be filled in this fashion. Alternatively, the flow connection may be interrupted, for example along the tubular member, to break the communication between the tank and the chamber, once the coating liquid in the coating chamber reaches a level above the lenses accommodated in the coating chamber. Coating proper will typically last for between 1 and 5 minutes, whereupon the apparatus may be returned to the initial relative position, such as illustrated in FIG. 3. In this position, the coating liquid will drain from the coating chamber back into the tank. For this purpose, valves 22 and 35 will be opened and valves 24 and 36 closed. When a valve member is provided in the tubular member, it may be closed when the apparatus is moved from the FIG. 2 to FIG. 3 position and then reopened for draining. That flow rate, too, may be adjusted by means of this valve or by a flow rate regulating device which may also serve as the isolation valve in its closed position. Draining will typically take 1 to 5 minutes. The lenses remain in the emptied coating chamber long enough for the drying, setting of the coating on the faces of the lenses from their support before they are removed from the coating chamber. The dried coated lenses may then be cured outside the chamber with conventional UV or irradiation means or thermal cure.

Thereupon, the apparatus is once again ready to receive another lens or set of lenses for coating.

It will be appreciated that such an apparatus may have various accessories, such as a timer to give the operator a visual or sound signal that the filling, coating or draining steps have been completed. The coating chamber and/or tank may be equipped with a sight or level detector to providing a signal indicating that the level of coating liquid is insufficient and that the tank needs to be filled or the tank and/or chamber needs to be replaced. It will be appreciated that such an apparatus is simple in construction and may be small enough for convenient use in an optician's workshop, given its small footprint and overall bulk. Such an apparatus may also have a reasonably long shelf-life, so that it may be used over many months without replenishing the coating liquid.

Thanks to the present invention, lens blanks may be delivered to an optician with an inexpensive and medium or low performance top coat which has a surface energy sufficiently high to enable the lens to be ground without the application of any temporarily layer. Such a medium or low performance top coat will protect the lens during handling and contour grinding and may also be satisfactory for some customers. The optician may advantageously offer a high quality top coat which may be applied on site with the present apparatus and/or according to the present method. Likewise, the optician may offer scratch resistant coatings with another such an apparatus and/or method in which case the scratch resistant coating will be applied before the high quality top coating. A primer coating may also be added before the scratch resistance coating with another such apparatus. Such lenses may be tinted with another such apparatus and/or method in which case the tinting will be programmed before any scratch resistant coating and therefore any high quality top coat.

In the first embodiment, the position of the coating chamber relative to the tank may be changed by grasping the apparatus as a unit in one's hands and simply turning it over. When the apparatus stands on the bottom of the tank, it is in the lens loading or coating chamber draining position, whereas when the apparatus stands on the top of the coating chamber, the apparatus is in the coating chamber filling position.

Figure 5:
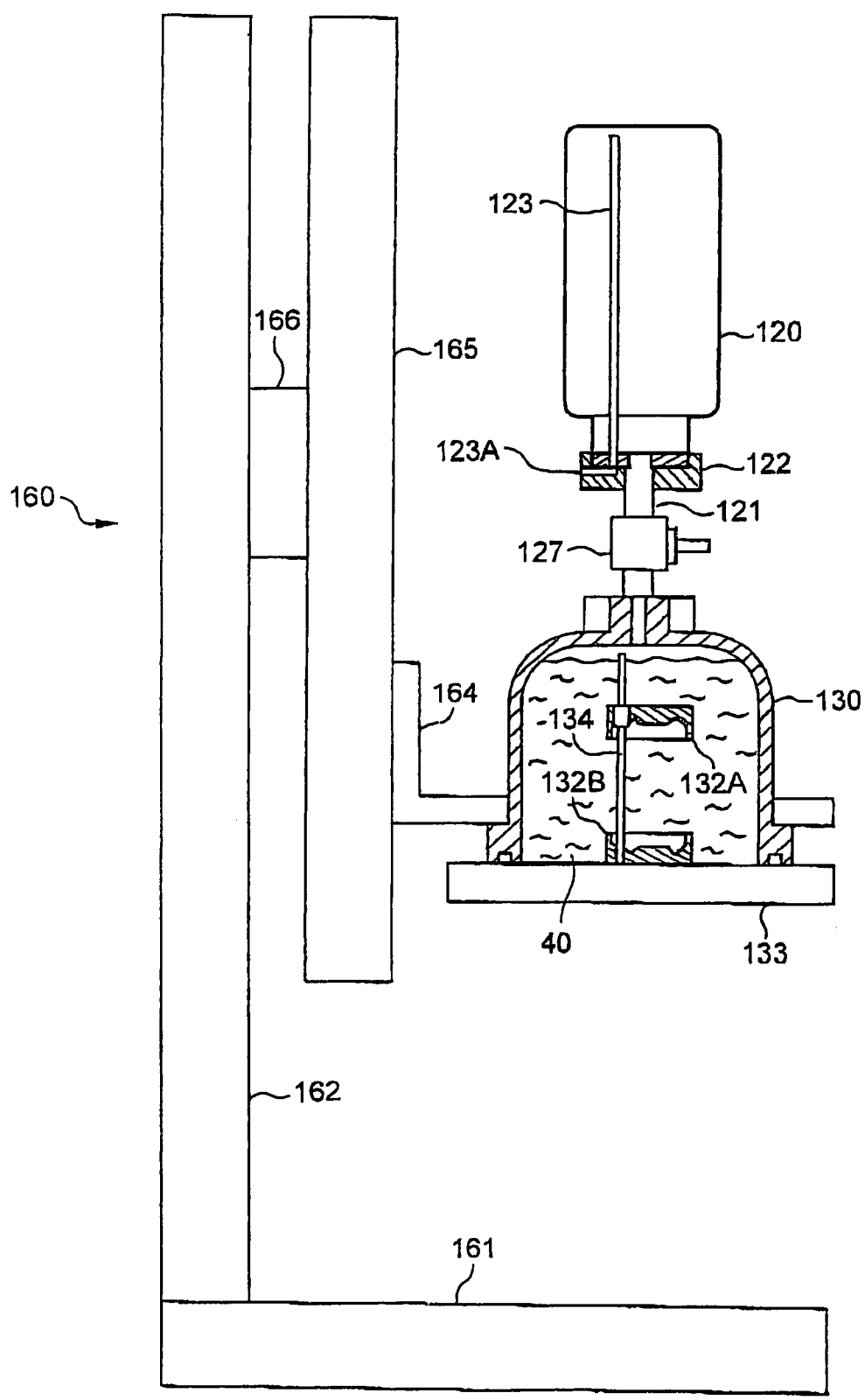
FIG. 5 is a schematic longitudinal view corresponding to FIG. 4, with the tank located above the coating chamber and showing the coating liquid dispensed from the tank to the coating chamber.

FIGS. 4 and 5 illustrate a second embodiment. The same numerals augmented by 100 are used for corresponding elements in the second embodiment. The most important difference between the embodiments is that the second embodiment enables the changing of the relative position of the tank and coating chamber by rocking or pivoting them from one position to the other. As illustrated, a stand with a pivoted arm is provided for this purpose.

The coating chamber 130 and the tank 120 are both of bottle-like configuration. The coating chamber comprises a bottle body 131 and a cover 133 therefor to close the open upper end of the bottle-like coating chamber. The cover is fitted with a vertical rod 134 traversing respective lens supporting elements 132A, 132B and in friction engagement therewith for movement and for mounting and maintaining them in the desired positions. Similarly, the tank 120 comprises a body member 126 and a cover 122. The cover can either be permanently secured to the bottom or adapted to be open and closed by suitable means, such as a threaded coupling or a snap coupling.

The apparatus comprises a stand 160 including a base member 161 adapted to be supported on a horizontal surface such as a shelf or work bench and an upright 162 fixed to the base member and extending upwardly therefrom. The tank 120 and coating chamber 130 are supported on a mount comprising a bracket 164 which supports the coating chamber regardless of the position thereof. The bracket is in turn secured to a carrier arm 165. The base member, upright and carrier arm may be aluminum structural members fixed to each other by suitable fasteners (not shown). Obviously, other kinds of structural members can be used for this purpose. Also, the stand comprising the base member and upright can be a unitary sub-assembly. In any event, a pivotal connection or rocking connection 166 is provided between the carrier arm 165 and the upright for pivoting or rocking the upright and coating chamber and tank unit therewith from the lens loading/unloading position which is also the position in which the coating liquid is drained from the coating chamber back to the tank and the coating liquid feeding position where the tank is located above the coating chamber for feeding coating liquid into the latter.

The operation of the second embodiment is substantially the same as the first embodiment, except that the coating chamber and tank unit are simply pivoted, rocked or swung from one position to the other. Check or manual valves corresponding to those described above may also be provided. In this embodiment, the tubular member 121 which also defines the mechanical inter-connections and support for the coating chamber/tank is equipped with a valve member 127 which may be used to interrupt fluid communication between the interior of the coating chamber and the interior of the tank and/or varying the flow rate of coating liquid either when it is dispensed into the coating chamber or drained therefrom. Also, the tank 120 is equipped with a venting tube 123 extending from the upper end of the tank to a location proximate the bottom wall of the tank and connected to the surroundings via vent passage 123A in cover or valve closure member 122 which is mounted for rotation between open and closed positions.

Irrespective of the embodiments, the particular features of the present apparatus, it may be manufactured at a fraction of the cost of known lens coating apparatuses, with a footprint and overall bulk sufficiently small so as to enable their use in the workshop or back room of an optician's office. It will be appreciated that lens coatings can be provided after the lens has been routed to the desired configuration of the frame surrounds and/or personalized to the consumer's wishes on the optician's premises to enable delivery in the increasingly shorter delivery times demanded by customers.

It will be understood that the foregoing description and examples are not limitative of the invention, the scope and spirit of which are defined in the appended claims.

What is claimed is:

1. Apparatus for dip coating ophthalmic lenses comprising a tank for containing a coating liquid, a coating chamber having a lens support for supporting one or more ophthalmic lenses, the tank being in fluid communication with said coating chamber for permitting the flow of the coating liquid between the tank and said coating chamber, said apparatus having a first position where said coating chamber is located above the tank and a coating chamber filling second position where the tank is located above said coating chamber, wherein said lens support is connected to an access cover for access to said coating chamber and removal therewith.

2. Apparatus according to claim 1, wherein the first position is a position for draining the coating liquid from the coating chamber.

3. Apparatus according to claim 1, wherein the first position is a lens loading/unloading position.

4. Apparatus according to claim 1, wherein the second position is a position for supplying the coating liquid to said coating chamber.

5. Apparatus according to claim 4, wherein said coating chamber has an access opening, said access cover for sealingly closing the access opening, said access cover being in contact with the coating liquid in the second position.

6. Apparatus according to claim 1, wherein the second position is a lens coating position.

7. Apparatus according to claim 1 wherein the tank is fixed relative to said coating chamber in the first and second positions.

8. Apparatus according to claim 1 wherein said coating chamber is located immediately above the tank in the first position and the tank is located immediately above said coating chamber in the second position.

9. Apparatus according to claim 1, further comprising a tubular member providing fluid communication between the said coating chamber and the tank, the tubular member being adapted to support said coating chamber in the first position and the tank in the second position.

10. Apparatus according to claim 1, wherein said coating chamber is rigidly connected to the tank.

11. Apparatus according to claim 10, wherein the rigid connection is releasable.

12. Apparatus according to claim 10, wherein the rigid connection is adjustable.

13. Apparatus according to claim 1, wherein said apparatus comprises a self-contained unit.

14. Apparatus according to claim 1, wherein said coating chamber and said tank are mounted for a combination of rocking and translatory movement between the first and second positions.

15. Apparatus for dip coating ophthalmic lenses comprising a tank for containing a coating liquid, a coating chamber having a lens support for receiving one or more ophthalmic lenses, said tank being in fluid communication with said coating chamber for permitting the flow of the coating liquid between said tank and said coating chamber, said apparatus having a first position where said coating chamber is located above said tank and a coating chamber filling second position where said tank is located above said coating chamber, said apparatus further including a stand, said coating chamber and said tank being pivotally mounted relative to the stand between the first and second positions.

16. Apparatus for dip coating ophthalmic lenses comprising a tank for containing a coating liquid, a coating chamber having a lens support for receiving one or more ophthalmic lenses, said tank being in fluid communication with said coating chamber for permitting the flow of the coating liquid between said tank and said coating chamber, said apparatus having a first position where said coating chamber is located above said tank and a coating chamber filling second position where said tank is located above said coating chamber, wherein said tank has a venting tube with an orifice proximate the bottom of said tank in communication with the surroundings.

17. Method for dip coating ophthalmic lenses comprising loading at least one lens in a coating chamber, simultaneously positioning a supply tank above the coating chamber and the coating chamber below the supply tank prior to transferring coating liquid from the supply tank to the coating chamber for coating the ophthalmic lenses therein, simultaneously positioning the coating chamber above the supply tank and the supply tank below the coating chamber to drain the coating liquid from the coating chamber back to the supply tank, and removing coated ophthalmic lenses from the coating chamber.

18. Method according to claim 17, wherein the simultaneous positioning is effected by swinging the supply tank and coating chamber conjointly.

19. Method according to claim 17, wherein the simultaneous position is effected by simultaneously pivoting the supply tank and the coating chamber.

20. Method according to claim 17, further comprising rigidly connecting the supply tank to the coating chamber.

21. Method according to claim 17, further comprising rigidly connecting the supply tank to the coating chamber through a tube for transferring coating liquid between the supply tank and coating chamber before effecting the steps of simultaneously positioning.

22. Method according to claim 17, further comprising loading/unloading the lens when the coating chamber is positioned above the supply tank.

23. Method according to claim 17, wherein the at least one lens is loaded in a lens support in the coating chamber.

24. Apparatus for dip coating ophthalmic lenses comprising a tank for containing a coating liquid, a coating chamber having a lens support for supporting one or more ophthalmic lenses, said tank being in fluid communication with said coating chamber for permitting the flow of the coating liquid between said tank and said coating chamber, said apparatus having a first position where said coating chamber is located above said tank and a coating chamber filling second position where said tank is located above said coating chamber, wherein said apparatus is pivotally mounted for movement between the first and second positions.

* * * * *